Figure 1:
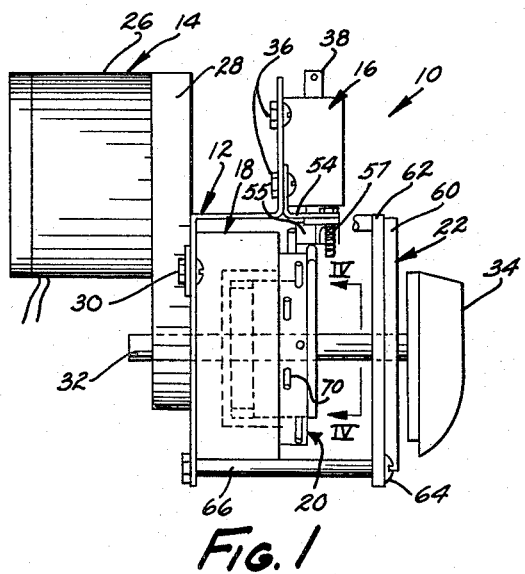

Dec. 10, 1963

F. R. HOOP ETAL 3,113,465

TIMER

Filed May 17, 1961

3 Sheets-Sheet 1

INVENTORS
FREDERICK R. HOOP
VICTOR O. ARNDT
BY

ATTORNEYS

INVENTORS
FREDERICK R. HOOP
VICTOR O. ARNDT
BY
ATTORNEYS

INVENTORS
FREDERICK R. HOOP
VICTOR O. ARNDT
BY

ATTORNEYS

United States Patent Office 3,113,465
Patented Dec. 10, 1963

3,113,465
TIMER
Frederick R. Hoop, Grand Rapids, and Victor O. Arndt, Hamilton, Mich., assignors to Tru-Soft Manufacturing Company, Grand Rapids, Mich., a corporation of Michigan
Filed May 17, 1961, Ser. No. 110,696
9 Claims. (Cl. 74—54)

This invention relates to timer mechanisms, and more particularly to a timer that operates variably in three dimensions and utilizes a unique step-by-step driving means having an automatic engaging and releasing means.

Timing mechanisms conventionally operate around a lobed cam which revolves in one plane and actuates one or more electrical switches, hydraulic valves or the like in each revolution. Thus, for example, if it is desired to operate a furnace or a water softener on a seven-day cycle using timer-actuated electrical switches, a battery of switches or switch contacts are placed around the periphery of a suitably marked disk which is traversed by the cam once each week.

Much of today's automatic equipment involves a very great number of switching operations. Since only a limited number of switches may be crowded around the disk of conventional timers, either the size of the disk must be greatly increased, or a number of successively operating and complexly interrelated timer mechanisms must be utilized. Even so, the sensitivity of these conventional timers is limited, such that timer actuation over a small interval of time which is a very small fraction of the pre-set cycle period is very inaccurate and difficult to control. For example, it is very difficult to actuate a timer accurately for fractions of a minute, or even a few minutes duration, when the timer is set on a seven-day cycle. These disadvantages of large timers with correspondingly large space consumption, limited capacity, and limited sensitivity are very real drawbacks which often prevent their effective use.

It is an object of this invention to provide a timer mechanism capable of vastly increased capacity to enable the control of a very large number of operations. It provides a timer which is actually very small in size in relation to its capacity, which is very sensitive and thus capable of causing accurately timed actions for a very small duration of time even though the overall time cycle controlled is very large, and which is very flexible in operation so as to be capable of controlling a wide variety of sequential operations.

It is another object to provide a timer wherein each revolution of the cam covers only a small fraction of the total time cycle controlled instead of covering the entire time cycle as with prior art devices.

It is another object of this invention to provide a timer that is simple in construction and yet that can very effectively operate in three dimensions instead of the customary two so that the possible variations in sequencing are greatly expanded. The three-dimensional effect is very accurately and automatically controlled in a step-by-step fashion with the third-dimensional movement occurring in an axial fashion with respect to the rotary timer and being periodic to the usual two dimensional movement.

A further object is to provide a timer wherein one switch will control the same number of operations that an entire battery of switches controlled with prior art devices.

Still another object of this invention is to provide a unique drive mechanism having automatic engaging and releasing means to accomplish the dual movement of (1) constant rotation by the switch-actuating cam in one plane and (2) step-by-step movement of the third-dimensional movement generally normal to (the one) plane. The drive mechanism operates two separate members in the form of telescoping rotors at a differential rate, with one rotor being moved in a periodic momentary fashion while the other rotor is constantly moved.

It is another object to provide such a unique drive mechanism which is very simply constructed from rolling members such as balls which operate in respective pockets and recesses into which the rolling members fit.

Figure 3:
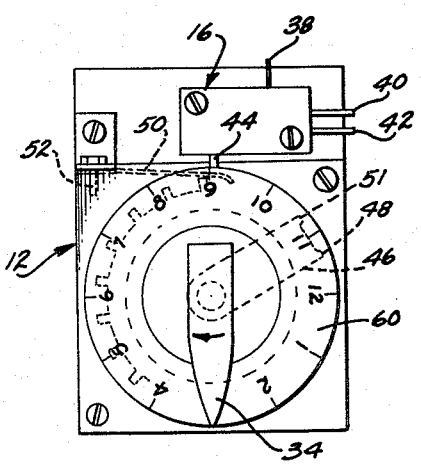
Figure 2:
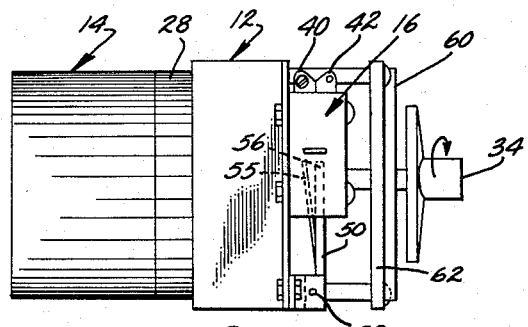
Figure 15:
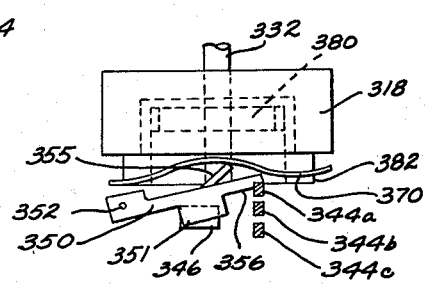
Figure 16:
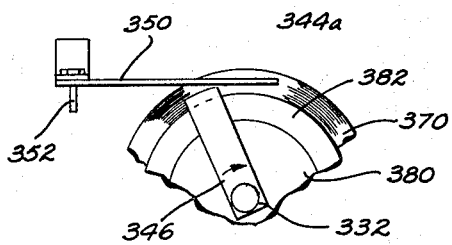
Figure 4:
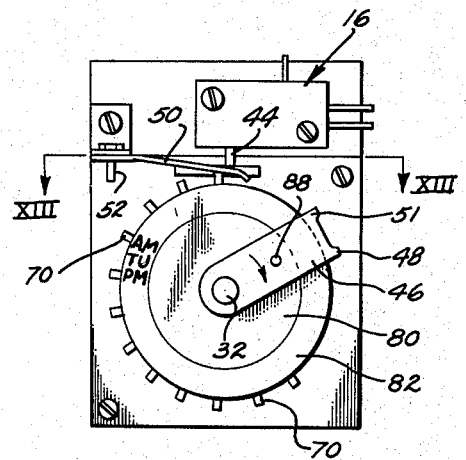
Figure 5:
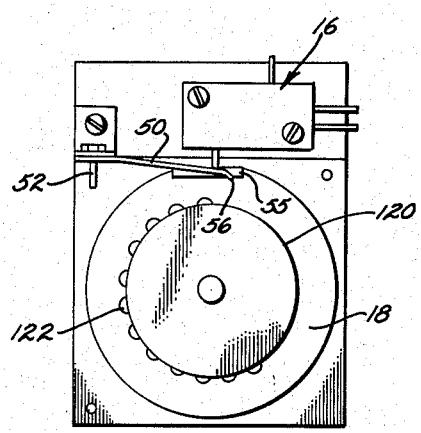
Figures 6, 7:
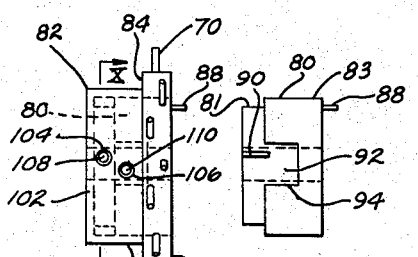
Figure 8:
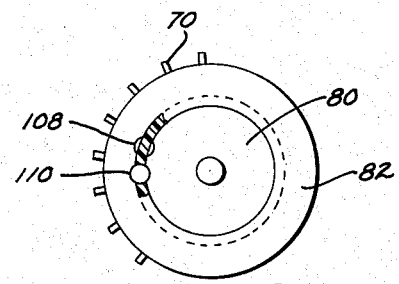
Figure 9:
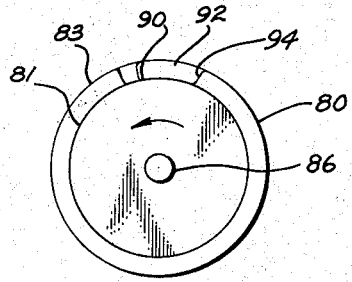
Figure 17:
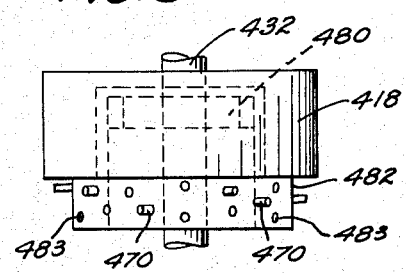
Figure 10:
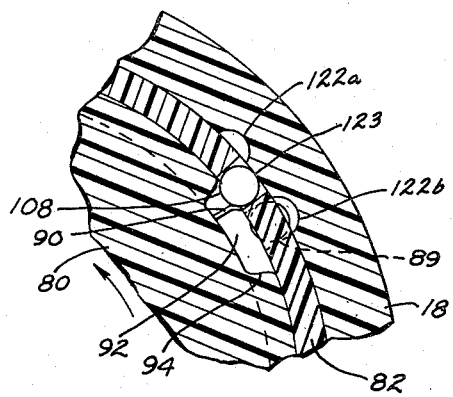
Figure 11:
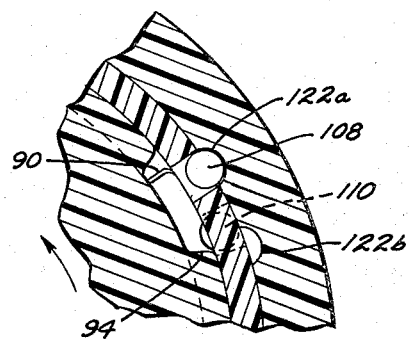
Figure 12:
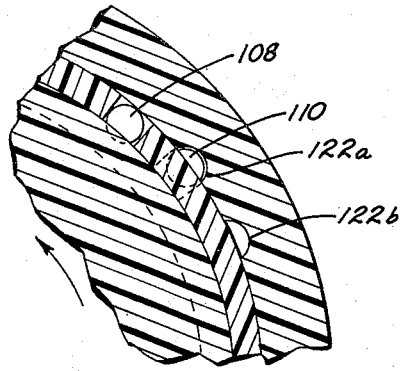
Figure 13:
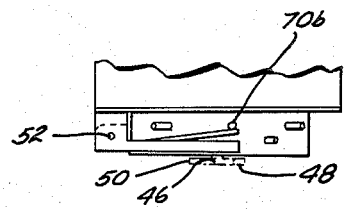
Figure 18:
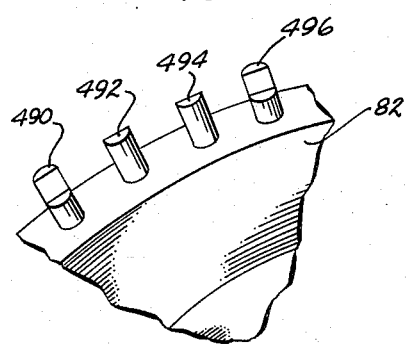
Figure 14:
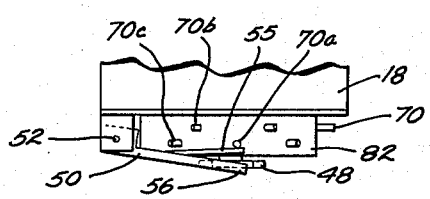

These and many other objects will be apparent upon studying the following specification in conjunction with the drawings in which:

FIG. 1 is a side elevation view of the novel timer;
FIG. 2 is a plan view of the timer illustrated in FIG. 1;
FIG. 3 is a front elevation view of the novel timer;
FIG. 4 is a sectional view of the timer taken on plane IX—IV of FIG. 1;
FIG. 5 is a front elevation view of the timer with the indicator dial, setting knob, and rotor means removed and depicting the stator;
FIG. 6 is a side elevation view of the rotor means, including an inner and an outer rotor;
FIG. 7 is a side elevation view of the inner rotor of the rotor means;
FIG. 8 is a front elevation and partially cut-away view of the rotor means shown in FIG. 6;
FIG. 9 is a rear elevation and slightly enlarged view of the inner rotor shown in FIG. 7;
FIG. 10 is a fragmentary sectional view taken on plane X—X of FIG. 6 and showing the engaging and releasing means between the inner and outer rotors;
FIG. 11 is a fragmentary sectional view of the means illustrated in FIG. 10 in a slightly different rotated position;
FIG. 12 is a fragmentary sectional view of the means illustrated in FIG. 10 in a still different position;
FIG. 13 is a fragmentary plan view taken on plane XIII—XIII of FIG. 4;
FIG. 14 is a fragmentary plan view of the apparatus illustrated in FIG. 13 in a slightly different position;
FIG. 15 is a fragmentary plan view of a modified stator, rotor means, and follower member for the novel timer;
FIG. 16 is a front elevation view of the apparatus illustrated in FIG. 15;
FIG. 17 is a fragmentary plan view of a modified rotor means depicting removable guide pins to provide an adjustable guide means; and
FIG. 18 is a fragmentary perspective view of a rotor showing rotatably adjustable pins to vary the axial effect thereof.

Basically, the inventive timer comprises camming means including at least one rotating cam for actuating electrical switches or the like at timed intervals, rotor means for rotating the cam or cams, and for periodically and momentarily rotating a guide means which moves axially with respect to the rotor means to cause the timer to operate in a third dimension normal to the plane or rotation. The rotor means comprises two rotors, an inner rotor and an outer rotor, and a unique drive means whereby the outer rotor which governs the axial guide means, is driven automatically, periodically and momentarily, and in a step-by-step shifting fashion by the inner rotor. The frequency of axial variation in the dimension normal to the regular plane of cam rotation is at least once for each revolution of the cam.

The drive means to cause the variation in the axial dimension includes an automatically engaging and releasing means which comprises a set of alternately actuated rolling members which momentarily and successively interlock the outer rotor governing the axial guide means with the inner rotor secured to the power member, preferably a drive shaft means, to shift the outer rotor a controlled amount and thereby shift the guide means to vary the axial camming function variation, and then release it to remain in the new position for a period of time. In the embodiment illustrated, the constantly-driven inner rotor rotates a revolving cam to actuate one or more switches. The particular guide means used may vary greatly in structure depending on the use of the timer.

Referring to FIG. 1, the timer mechanism 10 in the form of the invention there illustrated includes support 12, driving motor 14, switch 16, and the basic timer itself which comprises stator assembly 18, rotor means 20, a setting and indicator means 22, and a setting knob 34 secured on shaft 32.

The support plate 12 may be of sheet metal or other suitable material to which the other apparatus can be conveniently mounted as by bolts or the like. In the illustrative apparatus shown, the combined slow-speed motor 26 and step-down gearing in housing 28 are mounted to support 12 by bolts 30. The motor 26 may be any conventional electrical timer motor or even a controlled, spring-type motor if desired. Gearing housing 28 encloses a set of conventional gears to drive shaft 32 at a set speed determined by the time period desired for the rate of revolution of the switch operating cam. This conventional equipment is well-known to those in the art. The step-down gearing connects motor 26 to drive shaft 32 which extends through the timer mechanism. Setting knob 34 is attached to the front end of the shaft. A suitable one-way clutch such as a ratchet or its equivalent (not shown) may be included in housing 28 to allow the knob to be manually rotated only in the forward direction for setting of the timer. The timer illustrated operates in a clockwise direction and thus the knob may be manually rotated clockwise.

A conventional switch 16 to be operated is mounted to bracket 12 by bolts 36. Obviously, other devices such as hydraulic spool valves may be actuated by the timer cam, but the apparatus is explained in connection with conventional electrical switches with which it is preferably used. Switch 16 arbitrarily has three terminals 38, 40 and 42 to control two electrical circuits, one when the switch is not cam actuated and the second when the switch is cam actuated. Obviously this arbitrary switching arrangement may be replaced by any other one. Also, it must be realized that several switches may be arranged in a pattern around the timer instead of just one as shown. It is of considerable importance to note that this one switch illustrated as used on the novel timer will function to control one circuit in the place of a large number of switches on conventional timers used to control one circuit as will be understood upon reading the following description. Of course, more than one circuit may be operated by using a vertical bank of parallel contacts which when closed operate various circuits by being actuated with varying height cam lobes. Also, by using cams which follow each other around, a single set of contacts may operate more than one circuit due to axial shifting of the follower means used.

The switch is actuated by reciprocable arm 44 which extends into the path of revolving cam 46 to be reciprocated vertically thereby. Cam 46 is shown here to possess two lobes 48 and 51 but may alternatively include one lobe or any number of lobes as desired. In fact the cam may be a disc with any desired number of lobes. In the preferred form of the invention, cam 46 is fitted over shaft 32 and rotatively fixed to inner rotor 80. The lobes 48 and 51 shown cause the switch arm to be raised twice during each revolution of the cam.

In addition to cam 46, the camming means also includes a follower member 50 which is horizontally-pivotally mounted on pin 52, which in turn is mounted on flange 54 attached to support 12. Leg 56 of follower 50 extends tangentially toward the rotor means and protrudes between switch arm 44 and cam 46 such that the cam lobes 48 and 51 raise leg 56 upwardly against switch arm 44. The opening in follower 50 which fits over pin 52 is larger than the pin to allow the vertical movement of the follower under the influence of the cam. The purpose of the follower is to enable the timer to operate in an axial direction with respect to drive shaft 32 and the rotor means, in addition to the two-dimensional, planar operation of the rotating cam as explained more fully hereinafter.

Immediately behind setting knob 34 is a transparent indicator dial 60 which is manually rotatable to indicate time and thus allow intelligent setting of the timer. This dial is arbitrary and not a critical part of the inventive device. In FIG. 3, it is shown to have time-markers from 1 to 12 to cover a twelve-hour period, for example. The transparent dial may be made of glass or a plastic such as Lucite and is mounted on a transparent support plate 62 which is attached to the main support 12 by bolts 64 and spacers 66. The reason these are transparent is to allow an operator to see suitable markers placed on the outer rotor (FIG. 4).

The illustrated timer mechanism is not limited to the time period on dial 60 (here shown to be a twelve hour period) as would an ordinary timer. Rather, each revolution of the cam 46 (here covering twelve hours) comprises only a small fraction of the total time cycle covered as will be explained.

The basic timer itself comprises stator 18, rotor means 20, guide means which is here shown as axially-spaced, peripheral pins 70, and a unique drive means between the inner and outer rotors (FIGS. 6–12). The guided pins 70 control the axial position of follower 50 by contact with leg 55 of follower 50 which is biased toward the staggered pins by coil spring 57 around pin 52. Other equivalent biasing means may be used.

The rotor means 20 is composed of a set of coaxial, overlapping and telescopic, cylindrical rotors, here shown to be an inner rotor 80 and an outer rotor 82 (FIGS. 6 and 7). The rotors fit together telescopically, and both fit inside stator 18 up to shoulder 84 on the outer rotor 82. Drive shaft 32 extends through the back of stator 18, through the back 102 of outer rotor 82, and through inner rotor 80 at 86. The inner rotor is rotatably affixed to the shaft as by a suitable key (not shown) or a press fit so as to rotate therewith. It in turn rotates cam 46 which is slid over shaft 32 and connected to inner rotor 80 by pin 88. When the inner rotor 80 is fitted inside of outer rotor 82 as shown in FIG. 6, the pin 88 protrudes therefrom to connect to cam 46. It will be obvious that the cam 46 may be secured to shaft 32 independently of inner rotor 80.

Outer rotor 82 is generally a shell-type structure with the circumferential wall 98 being rather thin. The guide pins 70 are mounted to the outer periphery of outer rotor 82 in an axially spaced manner. The pins illustrated are shown generally in two axial positions (i.e. two planes normal to shaft 32) but this is merely illustrative since the pins may be staggered into any number of axial planes (i.e. for selectively actuating a plurality of switches). In fact, the guide means need not be formed of pins at all, since any axially-varying surface may be used as explained more fully hereinafter.

Inner rotor 80 is composed of two cylindrical portions of different diameters with rear portion 81 having a smaller diameter than front portion 83. Protruding radially from rear portion 81 is a flange 90 which extends outwardly to be coincident with the outer peripheral surface of portion 83. Adjacent projection 90 is an arcuate slot 92 made in the surface of larger diameter portion 83 to about the depth of lesser diameter portion 81. The follower surface 94 of this slot comprises an engagement means.

In the cylindrical shell surface of outer rotor 82 are two axially and circumferentially spaced pockets 104 and 106 in which a pair of balls 108 and 110 sit. The diameter of these balls is greater than the thickness of shell wall 98 such that they protrude on both sides thereof. When the inner and outer rotors are telescopically joined as disclosed in FIG. 6, ball 110 is an alignment with slot 92 and the enlarged diameter portion 83 of the inner rotor, while ball 108 is in alignment with lesser diameter portion 81 and flange 90.

Referring now to FIG. 5, the structure of stator 18 is seen in more detail with the rotor means removed as well as face plate 62, dial 60, and setting dial 34 removed. This stator is suitably affixed to support 12 by bolts or the like (not shown). The inner cylindrical periphery 120 of the stator includes a plurality of elongated concave recesses 122 which may extend the full width of stator 18 and which preferably correspond numerically with guide pins 70 on the outer rotor 82. Thus, when the rotor means, including the inner and outer rotors, is placed within the stator up to shoulder 84 of the outer rotor, balls 108 and 110 can move back and forth (i.e. radially of the rotors) in pockets 104 and 106, and in and out of recesses 122 in stator wall 120. The combination of these recesses 122, balls 108 and 110, pockets 104 and 106, flange 90 and follower surface 94 constitute a unique automatic engaging and releasing means for the outer rotor and thus the guide means, whereby the outer rotor is periodically shifted rotatably a small amount by a releasable driving connection being formed between it and inner rotor 80. In the illustrative apparatus disclosed, this shifting movement occurs once during each revolution of cam 46. The pockets and thus the balls are displaced circumferentially on outer rotor 82 a pre-set amount to cause the outer rotor to shift the angular equivalent of the distance between adjacent pins 70. The axial position of follower 50 and the camming function of the apparatus is determined in successive single revolutions of the inner rotor by the axial position of each successive pin as it is moved into contact with follower leg 55. Each pin may constitute the equivalent of a pre-set time cycle, e.g. the twelve hour period shown, so that when the inner rotor and the attached cam 46 make one complete revolution in each 12 hours, the outer rotor shifts the distance between adjacent pins to allow the axial camming function of the next 12 hours of operation to be controlled by the axial position of the next pin.

If desired, the cam 46 may be driven directly from shaft 32 and the inner rotor 80 may actually be integral with shaft 32. That is, the shaft itself (preferably an enlarged portion thereof) may possess a suitable flange 90, recess 92 and surface 94, and what is known as the "outer rotor" may be placed directly on this modified shaft. Thus the term "inner rotor" includes such a structure as well as the term "outer rotor" and the term "rotor means."

Assembly (in Brief)

First, the inner rotor 80 is inserted into the outer rotor 82. Then with the balls in their pockets the two rotors are placed around shaft 32 and into stator 18 which has been secured to support 12. Cam 46 is slipped over shaft 32 and connected to inner rotor 80 by pin 88. Then with the switch 16, and the motor 26 and gearing housing 28 connected to support 12, the transparent dial 60 are mounted to support 12 by bolts 64 and spacers 66. Knob 34 is attached to shaft 32. Follower 50 is placed on pin 52 and biased against pins 70 by spring 57.

Operation

The operation of the apparatus disclosed is more specifically as follows. The conventional slow speed motor 26 is then actuated by connecting it to a conventional electrical outlet. It rotates drive shaft 32 at a constant and very slow speed through the conventional step-down gearing mechanism 28. Setting dial 34 may be rotated clockwise to place cam 46 at the desired starting position. Indicating dial 60 may be manually rotated to any stationary position to indicate the proper time of setting and of camming. For example, referring to FIG. 3, the cam 46 is set to actuate switch 16 ten hours after the time of setting as cam 46 rotates around the face of dial 60. When leading lobe 48 of the cam contacts arm 56 of follower 50 with the follower in the position shown in FIG. 14, the cam lobe will raise leg 56 and this will in turn contact switch arm 44 to activate the switch to the second position.

When cam 46 and the inner rotor has made one complete revolution, the engaging means between the rotors causes a connection to be made therebetween to cause outer rotor 82 to shift rotationally the distance between two guide pins 70, such that arm 55 of follower 50 leaves axially outwardly pin 70A (FIG. 14) to contact the next pin 70B as it approaches (FIG. 13). This axial shifting of the follower occurs under the bias of spring 57 around pin 52. After this limited shift of the outer rotor has occurred, it is automatically released from the inner rotor and the driving source while the inner rotor continues to rotate at its constant rate of speed. In this second position in the apparatus as illustrated the follower is not in alignment with the rotating cam 46 such that as the cam 46 approaches the switch it will not contact the follower but will pass it by (FIG. 13) so that no switching action will occur in that revolution. Thus, during the second 12 hour period, the switch 16 is allowed to operate the first electrical circuit without interruption. As the second revolution of cam 46 and thus the inner rotor is completed, the outer rotor 82 is again shifted the distance between pins 70 to contact the next pin 70C. This sequence continues until the second rotor has made one complete revolution at which time the entire cycle begins over.

The unique drive mechanism controlling these rotors and which includes an automatic engaging and releasing means will be described with reference to FIGS. 10, 11 and 12. In FIG. 10 the inner rotor 80, outer rotor shell 82, and stator 18 are shown with balls 110 and 108 being centered in their respective pockets in outer rotor 82. As the inner rotor rotates clockwise in the apparatus disclosed in FIG. 6 (note that this movement appears as a counterclockwise movement when viewing FIGS. 10, 11, 12 due to the direction of the sectional view X—X in FIG. 6), the radially protruding flange 90 engages ball 108 since the ball is thicker than shell 82 and protrudes on the inner radial side. This engagement causes the outer rotor 82 to be driven by the inner rotor 80 until recess 122A in the stator inner periphery is reached by ball 108 at which time ball 108 slides into the recess 122A to become disengaged from flange 90. Flange 90 on the constantly moving inner rotor 80 then passes over ball 108. Simultaneously, ball 110 is pushed out of recess 122B by surface 89, so that ball 110 rides with the outer rotor. When ball 108 falls into recess 122A, ball 110 is adjacent surface 123 between recesses 122A and 122B and thus engages back surface 94 of the recess 92. This engagement of surface 94 with ball 110 again causes outer rotor 82 to be engaged with inner rotor 80 after flange 90 has passed over ball 108. This engagement of ball 110 continues until ball 110 falls into recess 122A with ball 108 being pushed out of recess 122A as shown in FIG. 12 so that it again is in alignment with the flange 90. The flange will contact the ball 108 again after making a complete revolution. It will be seen that the interengagement of ball 108 with flange 90 is the first partial driving means, and that ball 110 and surface 94 form a complementary and second driving means to place ball 108 in a position to be again contacted by flange 90. It should be noted that the axial spacing of balls 108 and 110 is determined merely by the position of the two portions 81 and 83 of the inner rotor 80 when assembled inside the outer rotor 82. The circumferential spacing of the balls is determined by the spacing of successive recesses 122A and 122B so that when one ball is on the shoulder between two successive recesses, the other will be coincident with a recess. The guide pins are angularly spaced to coincide with recesses to bring one pin up at a time. It will be observed that when the balls are in the position illustrated in FIG. 10, i.e., half way through the shifting function, it is possible to rotate the inner and outer rotors together by manually gripping and rotating the outer rotor since the balls will not catch in the stator pockets by so doing. This enables adjustment of the rotors with respect to the stator.

Since the elongated recesses 122 receive axially spaced balls, they may be substituted by generally hemispherical concavities if desired. Alternatively instead of using ball-type or spherical rolling members, elongated roller pins may be used if desired since these would operate essentially the same as balls.

It should also be noted that the singular driving means shown may be combined into two, three or even more successive and telescoping driving means. The stator then would constitute a third rotor which could be shifted a small amount with each revolution of the outer (or second) rotor. In other words, a revolution of the inner (first) rotor would cause a small angular shift of the outer (second) rotor; one revolution of the second rotor would mean a small angular shift of the third rotor, and so forth, with drive means including roller members, engaging surfaces, recesses, etc. being placed between each set of adjacent rotors.

Further, it will be readily apparent that an entire revolution of the inner rotor is not necessary to produce a shift of the outer rotors since two or more driving means including the balls and engaging surfaces may be placed around the periphery between the rotors. For example, two sets of balls may be placed opposite to each other so that flange 90 will contact first with the one and then with the other set to shift the rotor twice per revolution.

It will be noticed that part of the stator inner periphery as illustrated and part of the outer rotor outer periphery do not contain recesses and guide pins respectively. These may be placed variously around the peripheries as desired e.g. in groups since the unique driving means will drive the outer rotor from recess to recess (i.e. from pin to pin) no matter what the spacing is between them.

*Modification*

To illustrate the axial variability of the camming function, and thus the potential capacity of the novel timer, reference is made to FIGS. 15 and 16. These are fragmentary views showing a stator 318 and rotor means including inner rotor 380 and outer rotor 382, with drive shaft 332 extending through them. Suitably connected to the drive shaft is a suitable cam 346 which may have any number of lobes on its outer periphery and may be variously shaped. This cam rotates contantly along with the inner rotor 380 in a manner similar to the apparatus already described such that the cam contacts follower 350. The follower is horizontally pivotal on pin 352 and somewhat vertically movable on pin 352 to actuate switch arm 344A. Instead of guide pins to control the axial movement of follower 350, a suitable curving surface 370 may be provided for constant contact of arm 355 of follower 350. Thus, as the outer rotor 382 shifts rotatably in a periodic fashion, arm 355 and thus follower 350 shifts axially so that leg 356 of follower 350 coincides axially with one or more switches here shown to be three in number and identified 344A, 344B and 344C. Extended lateral surface 351 of follower 350 is provided so that cam 346 always contacts this surface no matter which axial position the follower may assume. Therefore, one or more of these switches is actuated each time by the camming means. The drive mechanism shown in FIGS. 5 through 9 is used in this modification. The spacing of recesses 122 may be regular or irregular to cause the outer rotor to move the same amount each shift of varying amount as desired. It will be obvious that many different types of guide surfaces or follower means may be used. For example a follower which merely reciprocates axially as guided by a curving track may be used instead of the rotating type shown. Also, the switches shown in one radial position here may be located variously around the periphery of the rotor means so that the number of operations controllable will be in the hundreds.

Referring now to FIG. 17, another type of guide means is shown in which the outer rotor 482 possesses a series of openings 483 into which suitable guide pins 470 may be inserted. Suitable detents (not shown) may be used to hold the pins in position. This enables one to adjust the axial function of the switch easily to produce a wide variety of combinations. The drive means explained with reference to previous figures is again used here between stator 418, outer rotor 482, and inner rotor 480 through which drive shaft 432 is inserted.

In FIG. 18 is shown another adjustable pin combination. In this modification, the individual pins such as 490, 492, 494 and 496 may be rotated manually in rotor 82 to vary the axial position of the end portion thereof due to its semicircular cross-section.

It will be obvious to those in the art from a study of the foregoing illustrative material that various modifications may be made in the structure; e.g. in the means for driving the camming means, in the structure of the camming means itself including various types of cams and various types of follower devices, in the number of rotors to be sequentially operated, in the arrangement and number of engagement and releasing means to be utilized between adjacent rotors, in the various types of guide means, in the type of devices to be actuated such as various types of switches or hydraulic valves, in the axial and circumferential arrangement of any number of switches, in the use of an integral stator and mounting plate, in the formation of switches as an integral part of the unit, in the addition of other camming members on the drive shaft to operate switches separately from the device shown, and many others. These obvious modifications are within the spirit of this invention, which invention is not to be limited by the illustrative material presented but only by the scope of the appended claims and the structures that are equivalent thereto.

We claim:

1. A timer mechanism comprising in combination: camming means including at least one radially projecting cam rotational on an axis, and radially and axially movable follower means adapted to shift radially under the influence of said cam; said follower means also adapted to shift axially; rotor means; axially varying guide means on said rotor means to control the axial position of said follower means by shifting thereof axially back and forth; and periodically-engaging rotational driving means for said rotor means, whereby said cam in cooperation with said follower means is capable of effectuating the radial camming operation in more than one axial plane.

2. A timer mechanism comprising in combination: radially projecting camming means rotational in a plane; means for constantly driving said camming means; rotor means rotatable on an axis; guide means on said rotor means; said guide means being variable back and forth in the dimension of said axis, and cooperable with said camming means to impart a variable camming function to said camming means in said axial dimension; and driving means for said rotor means and guide means and drivingly engageable therewith intermittently and periodically to cause said rotor means and guide means to have a periodic rotational function; whereby said camming means effectuates a selective, variable camming action in said axial dimension.

3. A timer mechanism comprising in combination: rotor means rotatable on an axis; guide means on said rotor means having portions in at least two axially spaced positions; camming means including at least one radially projecting rotational cam and a follower means cooperable with said cam so as to be shiftable radially thereby; said follower means also being cooperable with said axial guide means to be shifted axially thereby; means for constantly rotating said cam; and rotational driving means for said rotor means for periodically rotationally shifting said rotor means whereby said cam in cooperation with said follower means is capable of selectively effectuating its operation in more than one axial plane.

4. A timer mechanism comprising in combination: camming means including at least one rotatable radially projecting cam, and a follower means; means for constantly rotating said cam; rotor means; guide means on said rotor means having portions in at least two axially spaced positions; said camming means including a follower means positioned tangentially of said rotor means and cooperable with said guide means to shift axially therewith; said follower means being radially movable under the action of said cam at specific axial positions of said follower determined by said guide means; and drive means for said rotor means for periodically engaging said rotor means and shifting it rotationally to successively associate axially spaced portions of said guide means with said follower means.

5. A timing mechanism comprising, in combination: rotational drive shaft means; radially projecting camming means affixed to said shaft and rotatable therewith to actuate mechanisms to be operated on a timed basis; motor means positioned around said shaft; driving means between said shaft and said rotor means; said driving means being engageable at least once for every revolution of said camming means to rotationally shift said rotor means a small amount with said shaft means and then being released therefrom; guide means on said rotor means having portions in at least two axially spaced positions; said portions being consecutively placed in position by movement of said rotor means, and said camming means being associated with said guide means to effectuate a radial camming operation in at least two axially spaced positions under the influence of the consecutive guide portions.

6. A timing mechanism comprising: drive shaft means; radially projecting rotational camming means affixed to said shaft and rotatable therewith; rotor means positioned around said shaft; said rotor means including an inner rotor affixed to said shaft and having a generally cylindrical outer surface, and a shell-type outer rotor encompassing at least part of the cylindrical surface of said inner rotor and having an outer cylindrical surface; stator means around at least part of said outer rotor and having an inner cylindrical surface; a pair of axially spaced, circumferentially spaced roller member-receiving pockets extending radially through the shell of said outer rotor; a pair of roller members in said pockets and having a diameter greater than the thickness of said shell; a plurality of circumferentially spaced recesses in the inner cylindrical surface of said stator; intermittent, positive action driving means between said rotors including a radially projecting engaging means on the outer cylindrical surface of said inner rotor for alternately engaging with one of said roller members to cause said outer rotor to be periodically locked with said inner rotor to cause said outer rotor to shift rotatively a small amount with respect to said stator and said small amount being caused partially by engagement of said first roller member and partially by engagement of said second roller member; and guide means on said outer rotor having portions in at least two axially spaced positions and cooperable with said camming means to cause said camming means to radially perform in at least two axial positions.

7. A timing mechanism comprising: support means; drive shaft means; motor means connected to said shaft and mounted on said support; stator means mounted on said support; rotor means inside said stator means and around said shaft; said rotor means including an inner rotor rotationally keyed to said shaft, and an outer rotor at least partially enveloping said inner rotor; driving means between said rotors engageable at least once per each revolution of said inner rotor to shift said outer rotor, and releasable after shifting said outer rotor a small fraction of a revolution; radially projecting camming means adjacent said rotor means and affixed to said shaft to rotate therewith; guide means on the outer periphery of said outer rotor and positioned in at least two axially spaced positions; said camming means including radially shiftable follower means biased into contact with said guide means to thereby sequentially assume at least two axial positions as said outer rotor and guide means is shifted; said follower means also being associated with said camming means in at least one of said axial positions, whereby when said outer rotor is periodically shifted, a new portion of said guide means axially shifts said follower means to cause said camming means to be capable of radial functioning in at least two axial planes.

8. A timer drive mechanism including drive shaft means; rotor means around said shaft; said rotor means including an inner rotor and an outer shell-type rotor; stator means around said outer rotor; said inner rotor being constantly rotatable with said shaft; driving means between said rotors for periodically engaging said inner and outer rotors together to cause said outer rotor to be periodically rotatably shifted by said inner rotor; said driving means comprising: a pair of roller members; a pair of axially and circumferentially spaced pockets in the shell of said outer rotor for receiving said roller members; said roller members having a diameter greater than the thickness of said shell; a plurality of circumferentially spaced recesses in said stator and adapted to receive portions of either of said roller members; said inner roller having a smaller diameter portion corresponding axially with one of said roller members and having a radially projecting driving surface engageable with one of said roller members once each revolution; said inner rotor also having a larger diameter portion with a recess therein over a small arcuate portion thereof both corresponding axially with the second roller member and a roller member engaging follower surface on said slot circumferentially spaced from said engaging surface on said smaller diameter portion so that said engaging member and follower surface are for alternately engaging with and releasing from said roller members to periodically shift said outer rotor during constant rotation of said inner rotor with the engagement of said engaging means and first roller causing a first portion of the movement of the outer rotor and the engagement of the follower surface and the second roller member causing the second portion of the outer rotor movement with the total movement of the outer rotor being limited to a small arcuate portion of a revolution.

9. A timer drive mechanism comprising: a drive shaft capable of being constantly driven by a motor; rotor means around said shaft; and stator means around said rotor means; said rotor means including an inner rotor engaging said shaft, and an outer rotor at least partially enveloping said inner rotor; said outer rotor having a shell-type wall including a pair of axially and circumferentially spaced pockets; a pair of roller members in said pockets and having a diameter greater than the thickness of said wall; a plurality of spaced concave recesses in the inner peripheral wall of said stator capable of accommodating a portion of each of said roller members; the circumferential spacing of said roller members being non-coincident with that of said recesses to prevent simultaneous matching of both roller members with recesses; said inner rotor having a cylindrical portion of lesser diameter and a cylindrical portion of greater diameter, such that a clearance exists between said lesser diameter portion and the inner periphery of said outer rotor; one of said roller members being axially aligned with each of said two portions; a radially projecting means on said lesser diameter portion to engage with the corresponding roller member at least once each revolution of said inner rotor; and a peripheral recess in the outer surface of said large diameter portion positioned so as to accommodate a second one of said roller members while said projecting means is engaging said first roller member; the follower surface of said recess being positioned to engage said second roller member after said first roller member moves into one of said stator recesses whereby said first roller member is moved out of said recess after said projecting means has passed thereover and said second roller member is then moved into a recess.

References Cited in the file of this patent

UNITED STATES PATENTS

| | | |
|---|---|---|
| 2,009,303 | Snow | July 23, 1935 |
| 2,593,727 | Cadwell et al. | Apr. 22, 1952 |

FOREIGN PATENTS

| | | |
|---|---|---|
| 910,861 | Germany | May 6, 1954 |